(12) United States Patent
Kishimoto

(10) Patent No.: US 10,833,312 B2
(45) Date of Patent: Nov. 10, 2020

(54) PRESSING DEVICE FOR ELECTRODE PLATE AND MANUFACTURING METHOD FOR ELECTRODE PLATE

(71) Applicant: TOYOTA JIDOSHA KABUSHIKI KAISHA, Toyota (JP)

(72) Inventor: Tetsuro Kishimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 15/699,496

(22) Filed: Sep. 8, 2017

(65) Prior Publication Data

US 2018/0076443 A1 Mar. 15, 2018

(30) Foreign Application Priority Data

Sep. 13, 2016 (JP) .................................. 2016-178969

(51) Int. Cl.
*H01M 4/04* (2006.01)
*H01M 4/70* (2006.01)

(52) U.S. Cl.
CPC ........... *H01M 4/0435* (2013.01); *H01M 4/70* (2013.01)

(58) Field of Classification Search
CPC ............................................. H01M 4/0435–70
See application file for complete search history.

(56) References Cited

U.S. PATENT DOCUMENTS

| 2009/0100669 A1* | 4/2009 | Ikeda | H01M 4/0435 |
| | | | 29/623.2 |
| 2014/0311867 A1* | 10/2014 | Kanno | B65G 35/04 |
| | | | 198/618 |

FOREIGN PATENT DOCUMENTS

| JP | 2012-129147 A | 7/2012 |
| JP | 2015-140237 A | 8/2015 |

* cited by examiner

*Primary Examiner* — Osei K Amponsah
(74) *Attorney, Agent, or Firm* — Sughrue Mion, PLLC

(57) ABSTRACT

A pressing device for an electrode plate has a free roll, which is in contact with one surface of an electrode plate, and a nipping bar that presses the electrode plate against the free roll when conveyance of the electrode plate is stopped. On a surface of the nipping bar on an electrode plate side, a concave surface is formed, which has a curvature matching a curvature of a curve of an outer surface of the electrode plate on the free roll. A first angle of the concave surface, which is seen from a central axis of the free roll when the nipping bar is in a pressed state, is included in a second angle of a contact region between the electrode plate and the free roll. A size of a first angle region is within a range of 10~80% of a size of the second angle.

5 Claims, 7 Drawing Sheets

PRESSING DEVICE FOR ELECTRODE PLATE AND MANUFACTURING METHOD FOR ELECTRODE PLATE

INCORPORATION BY REFERENCE

The disclosure of Japanese Patent Application No. 2016-178969 filed on Sep. 13, 2016 including the specification, drawings and abstract is incorporated herein by reference in its entirety.

BACKGROUND

1. Technical Field

The disclosure relates to a pressing device for an electrode plate, which presses and thus fixes an electrode plate that is conveyed in an electrode plate manufacturing process when the conveyance is stopped, and also relates to a manufacturing method for an electrode plate, in which the pressing device is used. To be more specific, the disclosure relates to a pressing device that is designed to restrain local peeling of an electrode mixture layer on a surface of an electrode plate while pressing, and a manufacturing method in which the pressing device is used.

2. Description of Related Art

In manufacturing a long foil-shaped member, a foil-shaped member that has been manufactured or being manufactured is often conveyed from a pre-process to a post-process. There are various types of issues at a scene of the conveyance, and ways of solving these issues are proposed. One of the examples is Japanese Patent Application Publication No. 2015-140237 (JP 2015-140237 A). In the technology described in JP 2015-140237 A, a "touch roll" is brought into contact with a film immediately before a winding process in which the conveyed film is wound up on a winding shaft ([0017] and FIG. 1 in JP 2015-140237 A). The film is wound up on the winding shaft while the touch roll is pressing the film. It is said that air is thus prevented from being included in a film roll obtained ([0025] in JP 2015-140237 A).

SUMMARY

However, if the foregoing related art is applied to an electrode plate of a battery, the following matters can happen. Usually, an electrode plate of a battery has a structure in which a surface of a current collector foil is coated with an electrode mixture layer, and there is a process in which an electrode plate having such a structure is conveyed from a pre-process (for example, a drying process) towards a post-process (for example, a press slitting process). In that case, a roll member is pressed against one surface side of the electrode plate, so that adequate tension is applied. Here, when equipment is stopped, some kind of member is pressed against the other surface side of the electrode plate, and the electrode plate is nipped between this member and the roll member. This is for preventing a position of the electrode plate from shifting in a width direction when no tension is applied during stoppage of the equipment.

It is considered that the "touch roll" described in JP 2015-140237 A is used as the member to be pressed against the other surface side of the electrode plate during the stoppage. However, when the touch roll is pressed against the electrode plate, there are instances where a part of the electrode mixture layer is locally peeled. This causes the following phenomenon. First, a portion of the electrode plate where electrode mixture layer is peeled results in a defect called lack of hiding where no electrode mixture layer is present. Secondly, there are instances where a peeled piece caused by the peeling remains stuck on the touch roll. In this case, when the touch roll is pressed against an electrode plate next, the peeled piece can attack an electrode mixture layer and cause a defect called bruise. In such a case, new peeling tends to happen easily. Thirdly, there are instances where the peeled piece is conveyed to a post-process and causes bruise similarly to the above.

The disclosure provides a pressing device for an electrode plate and a manufacturing method for an electrode plate using the pressing device. The pressing device is designed so that local peeling of an electrode mixture layer hardly occurs even when the electrode plate is pressed while conveyance is stopped.

A pressing device for an electrode plate according to an aspect of the disclosure is a device in which the electrode plate has an electrode mixture layer at least on a first surface of the electrode plate, and the pressing device includes a roll member that is in contact with a second surface of the electrode plate being conveyed, and a pressing member that comes into contact with the first surface of the electrode plate and presses the electrode plate against the roll member when conveyance of the electrode plate is stopped. A concave surface section is formed on a surface of the pressing member that comes into contact with the electrode plate. The concave surface section is a concave surface with a curvature that matches a curvature of a curve of the first surface of the electrode plate on the roll member. A first angle region is included in a second angle region. The first angle region is an angle region of the concave surface section seen from a central axis of the roll member in a state where the electrode plate is pressed against the roll member by the pressing member, and the second angle region is an angle region of a contact region between the second surface of the electrode plate and the roll member, which is seen from the central axis of the roll member. A size of the first angle region is within a range of 10~80% of a size of the second angle region.

The pressing device for the electrode plate according to the above aspect operates as follows. First, in a conveying state where the electrode plate is conveyed, the pressing member is in a retracted state in which the pressing member is separated from the electrode plate. In this state, although the roll member is in contact with the second surface of the electrode plate, the pressing member is not in contact with the first surface of the electrode plate. When the conveyance of the electrode plate is stopped, the pressing member moves and comes into contact with the first surface of electrode plate. This state is a pressed state in which the pressing member presses the electrode plate against the roll member. Thus, the electrode plate is prevented from being displaced in the width direction while the conveyance is stopped. Here, the concave surface section is formed in the pressing member, and the concave surface section comes into contact with the first surface of the electrode plate. Therefore, contact between the pressing member and the electrode plate is not line contact but surface contact. Thus, an impact when the pressing member comes into contact with the electrode plate is dispersed across the entire contact surface. Also, a relationship between a contact region of the pressing member and the electrode plate, and a contact region of the electrode plate and the roll member in the pressed state is adjusted appropriately. This prevents defects (lack of hiding, bruise) of the electrode mixture layer of the electrode plate due to an impact at the time of contact, and tear of the electrode plate due to friction.

In the pressing device for the electrode plate according to the foregoing aspect, a push-out member may be provided. The push-out member moves the pressing member at speed within a range of 1.0~2.5 mm/second from a separated position where the pressing member does not press the electrode plate to a pressing position where the pressing member presses the electrode plate. This means that there is an adequate range of moving speed for the pressing member to move from the separated position to the pressing position. This is because, when the moving speed is too high, an impact becomes great when the pressing member comes into contact with the electrode plate, which is not favorable. Meanwhile, when the moving speed is too low, pressing of the electrode plate happens too late with respect to the stoppage of conveyance, which is not favorable either.

In the pressing device for the electrode plate according to the foregoing aspect, the pressing member may be a stationary pressing member that presses the electrode plate against the roll member in a stationary state. For example, when a rolling member, like a roll-shaped member, is used as the pressing member, contact between the pressing member and the electrode plate becomes line contact, which is not able to mitigate an impact at the time of contact. With this stationary pressing member, that is impossible to happen.

Another aspect of the disclosure relates to a manufacturing method for an electrode plate, in which the electrode plate is conveyed from a conveying origin to a conveying destination. The electrode plate has an electrode mixture layer at least on a first surface of the electrode plate. In the manufacturing method according to this aspect, when conveying the electrode plate from the conveying origin to the conveying destination, a roll member is brought into contact with a second surface of the electrode plate being conveyed, and, when the conveyance of the electrode plate is stopped, a pressing member is brought into contact with the first surface of the electrode plate and presses the electrode plate against the roll member. Also, as the pressing member, one that has a concave surface section is used. The concave surface section is formed on a surface of the pressing member that comes into contact with the electrode plate, and the concave surface section is a concave surface with a curvature that matches a curvature of a curve of the first surface of the electrode plate on the roll member. A first angle region of the concave surface section is included in a second angle region. The first angle region is an angle region of the concave surface section seen from a central axis of the roll member in a state where the electrode plate is pressed against the roll member by the pressing member, and the second angle region is an angle region of a contact region between the second surface of the electrode plate and the roll member, which is seen from the central axis of the roll member. A size of the first angle region is within a range of 10~80% of a size of the second angle region. This means that the electrode plate is manufactured while using the pressing device for the electrode plate according to the foregoing aspect during a conveying process of the electrode plate.

In the pressing device for the electrode plate according to the foregoing aspect, the first angle region may be in a range from a start-of-contact position to an end-of-contact position between the electrode plate and the concave surface of the pressing member when the electrode plate is conveyed, and the second angle region may be in a range from a start-of-contact position to an end-of-contact position between the electrode plate and the roll member when the electrode plate is conveyed.

In the pressing device for the electrode plate according to the foregoing aspect, the surface of the pressing member that comes into contact with the electrode plate may include a surface that is depressed more than a virtual cylindrical surface extended from the concave surface in a view from the electrode plate side.

According this structure, the pressing device for the electrode plate, and the manufacturing method for the electrode plate using the pressing device are provided, in which local peeling of an electrode mixture layer hardly happens even when the electrode plate is pressed during stoppage of conveyance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
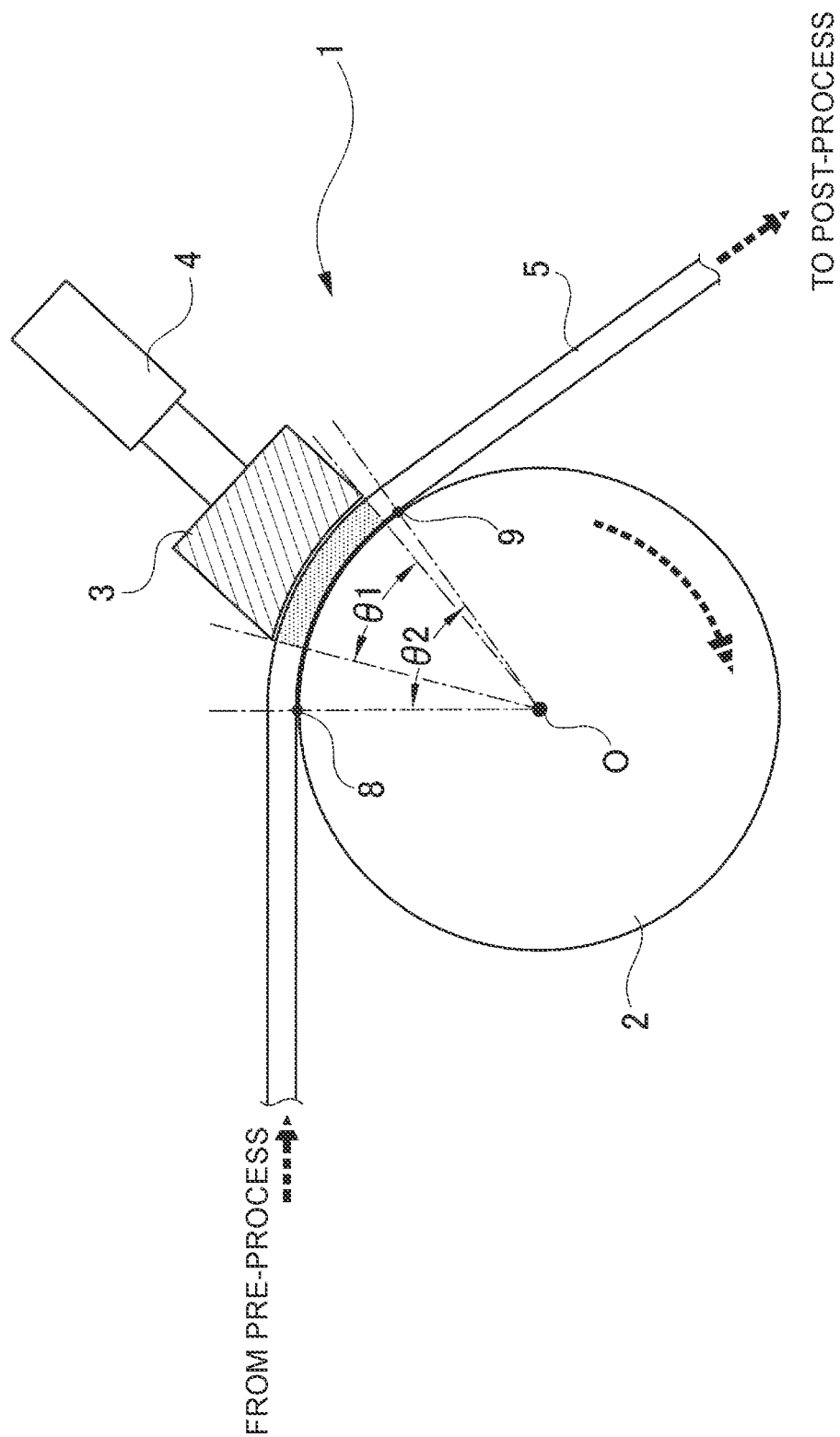
FIG. 1 is a sectional view of a structure of a pressing device for an electrode plate according to an embodiment.

Herein below, an embodiment, in which the disclosure is embodied, is explained in detail with reference to the attached drawings. In this embodiment, the disclosure is applied to a pressing device 1 for an electrode plate shown in FIG. 1. The pressing device 1 shown in FIG. 1 has a free roll 2 and a nipping bar 3. The position of the free roll 2 is fixed, and the free roll 2 is able to rotate freely about a shaft. The free roll 2 is not provided with rotation driving means. The nipping bar 3 has a push-out member 4. Because of this, the nipping bar 3 is changeable between a state of being pressed against the free roll 2 (FIG. 1) and a state of being retracted from the free roll 2 (FIG. 2). The pressing device 1 is provided in a process of conveying an electrode plate 5 from a pre-process to a post-process. The electrode plate 5 is a long foil-shaped member having a structure in which a surface of a current collector foil is coated with an electrode mixture layer, and is used as a component of a lithium ion secondary battery or other types of batteries.

When the electrode plate 5 is conveyed normally, the nipping bar 3 in the pressing device 1 is in the retracted state as shown in FIG. 2. In this state, the free roll 2 rotates by being dragged by the electrode plate 5 that is being conveyed. Also, the free roll 2 is in contact with one surface of the electrode plate 5 (a lower side surface in FIG. 2). Thus, the free roll 2 is pressed against one surface of the electrode plate 5. Therefore, a certain tension is applied to the electrode plate 5.

Figure 2:
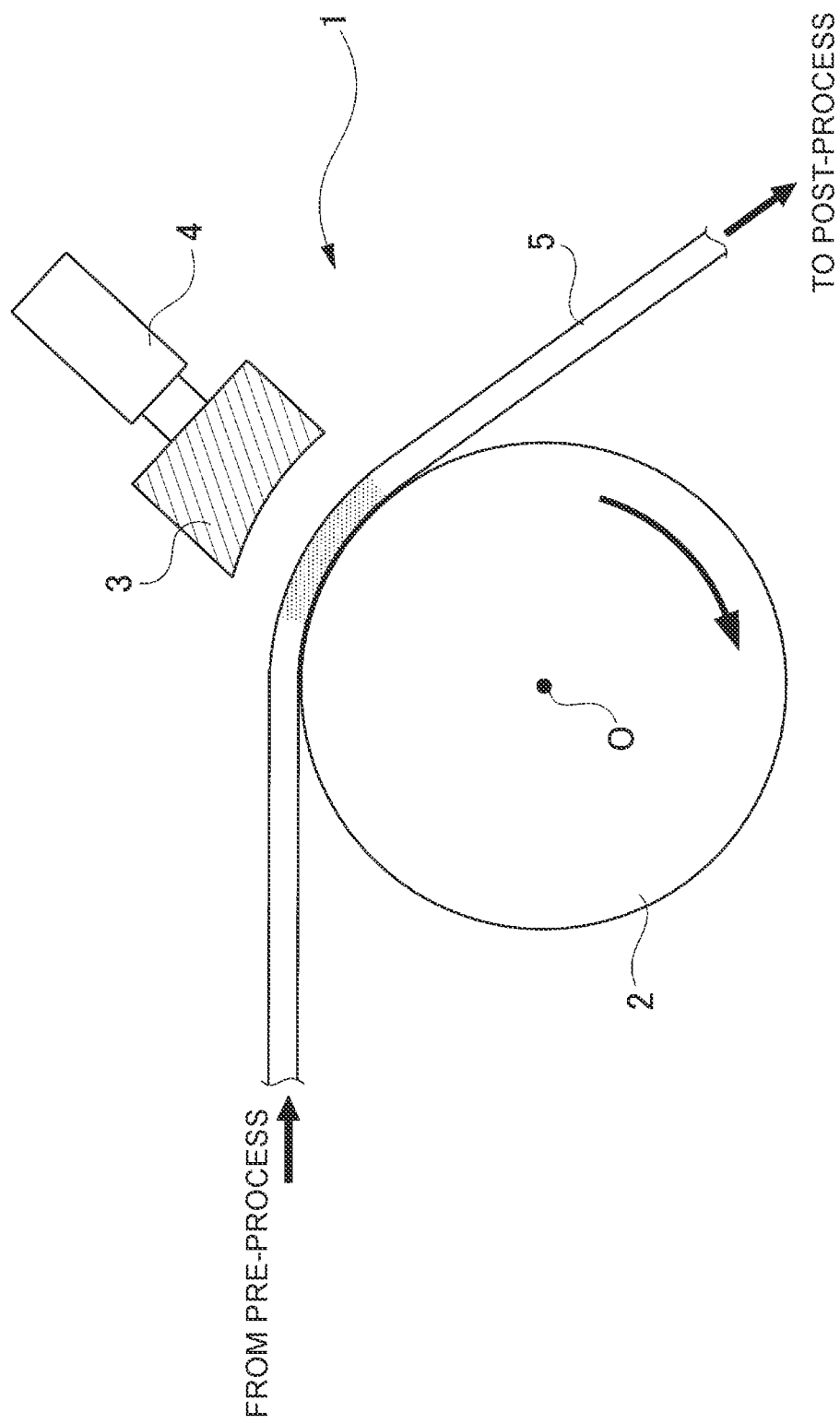
FIG. 2 is a sectional view of the pressing device in a state where the electrode plate is passing.

The nipping bar 3 of the pressing device 1 is in the pressed state shown in FIG. 1 when conveyance of the electrode plate 5 is stopped. In this state, the electrode plate 5 is nipped between the free roll 2 and the nipping bar 3. This means that the nipping bar 3 is in contact with one surface of the electrode plate 5 (an upper side surface in FIG. 1) in a stationary state, and presses the electrode plate 5 against the free roll 2. Because of this, while conveyance of the electrode plate 5 is stopped, the electrode plate 5 is prevented from moving in the width direction. Conveyance of the electrode plate 5 is stopped when an operation of equipment is stopped in consideration of the equipment, or when one roll of the electrode plate 5 is completely wound up at some point in the post-process. A process that can come to the position of the post-process in FIG. 1 and FIG. 2 is, for example, a pressing process by a press roll 6 shown in FIG. 3.

Figure 4:
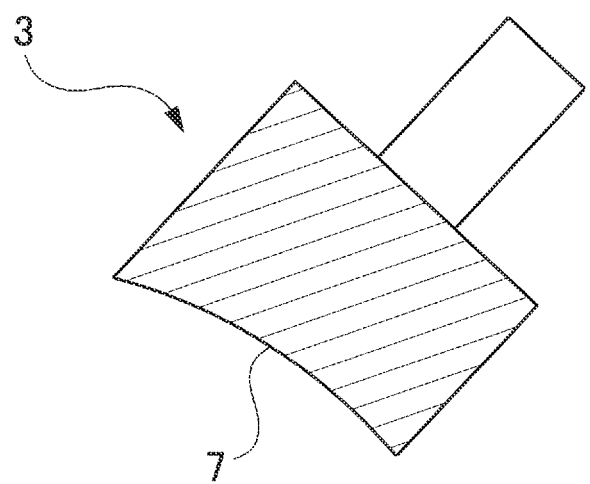
FIG. 4 is a sectional view of details of a nipping bar.

The nipping bar 3 is explained in further with reference to FIG. 4. As shown in FIG. 4, a surface of the nipping bar 3 that is in contact with the electrode plate 5 serves as a concave surface 7. A curvature of the concave surface 7 meets a curvature of a curve of an outer surface of the electrode plate 5 wound on the free roll 2. A size of the concave surface 7 in the conveying direction for the electrode plate 5 is defined relevant to a contact range between the electrode plate 5 and the free roll 2. This means that, in the pressed state shown in FIG. 1, an angle $\theta1$ and an angle $\theta2$ are defined with respect to a central axis O of the free roll 2.

The angle $\theta1$ is an angle of the concave surface 7 of the nipping bar 3 seen from the central axis O. This means that a range occupied by the angle $\theta1$ is a range from a start-of-contact position to an end-of-contact position between the electrode plate 5 and the concave surface 7 of the nipping bar 3 when the electrode plate 5 is conveyed. Meanwhile, the angle $\theta2$ is an angle of a contact region between a surface of the electrode plate 5 on the free roll 2 side and the free roll 2, seen from the central axis O. This means that the range occupied by the angle $\theta2$ is a range from a start-of-contact position 8 to an end-of-contact position 9 between the electrode plate 5 and the free roll 2 when the electrode plate 5 is conveyed.

There are two relationships between the foregoing angle $\theta1$ and angle $\theta2$. The first relationship is that the region occupied by the angle $\theta1$ is included in the region occupied by the angle $\theta2$. Thus, the region of the angle $\theta1$ does not go beyond the region of the angle $\theta2$ on the front and rear. This means that, within the range where the concave surface 7 is in contact with the electrode plate 5, the free roll 2 is always in contact with the other surface of the electrode plate 5 on the opposite side of the concave surface 7. The second relationship is that the size of the angle $\theta1$ is within a range of 10~80% of the size of the angle $\theta2$.

Figure 3:
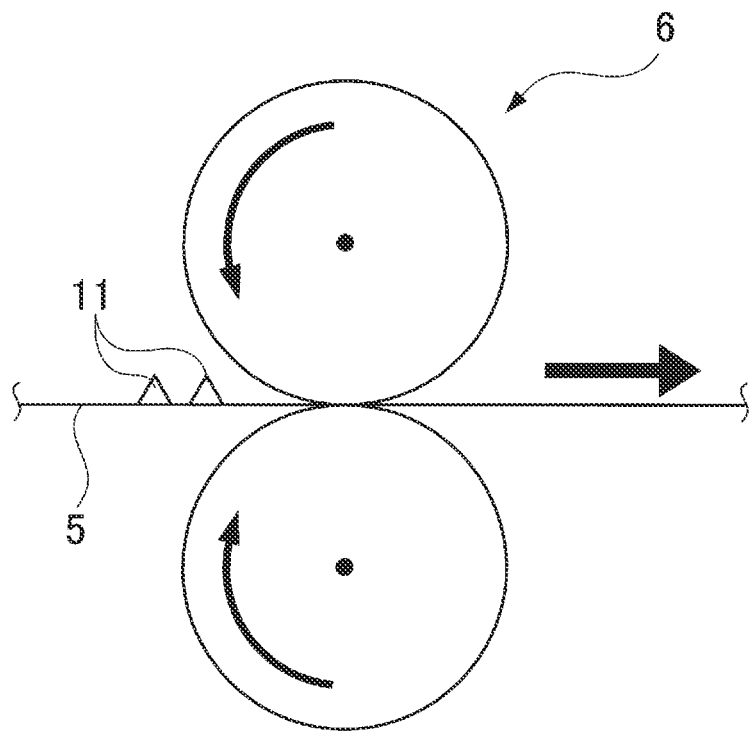
FIG. 3 is a sectional view of a press roll.
Figure 5:
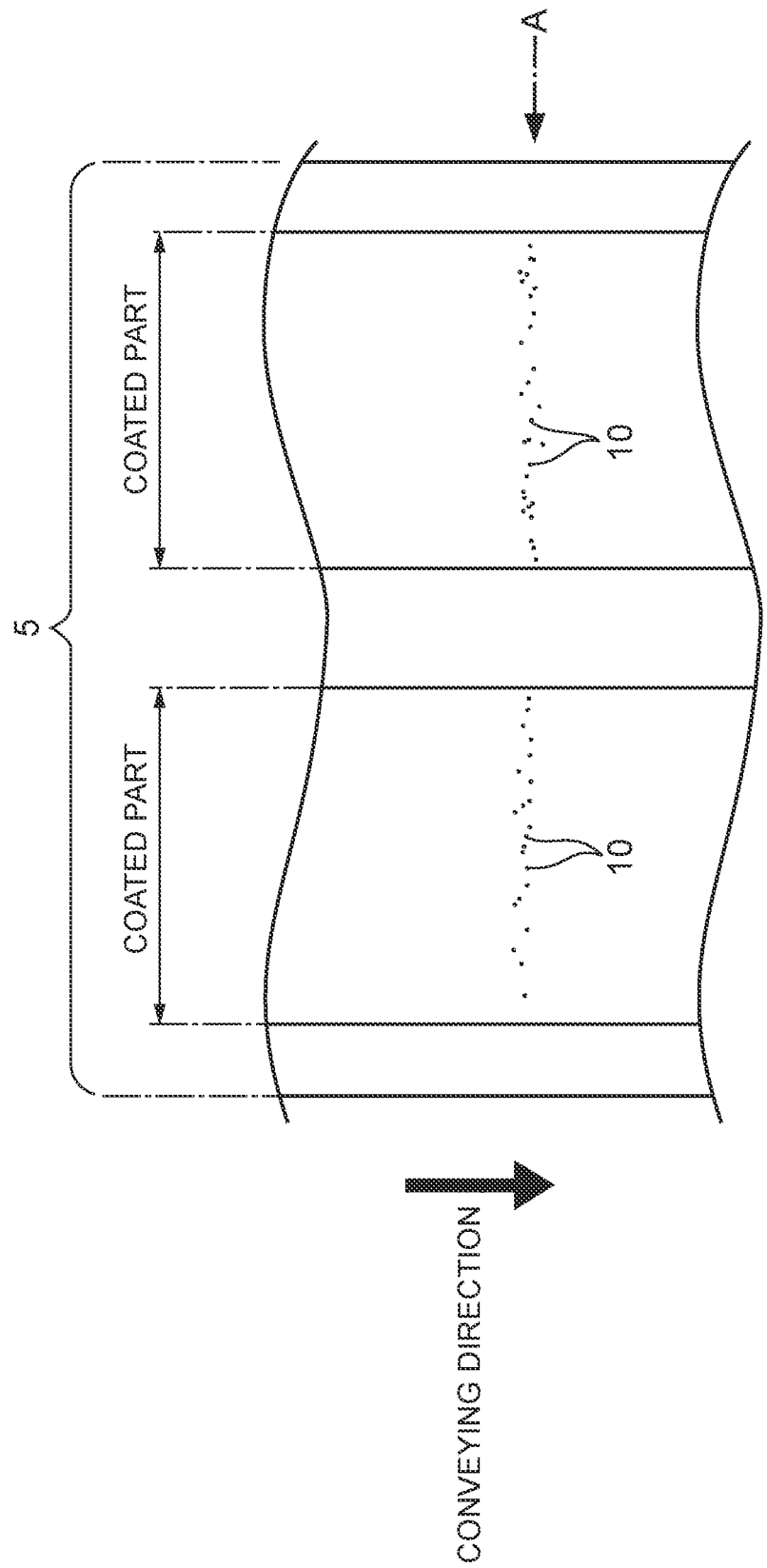
FIG. 5 is a plan view of a situation where lack of hiding happens in the electrode plate.

Because of the above-mentioned relationships between the angle $\theta1$ and the angle $\theta2$, the following advantages are obtained. First of all, when the nipping bar 3 is in contact with the electrode plate 5, peeling of an electrode mixture layer is unlikely to happen. Also, bruise is unlikely to happen. This is because an impact at the time of contact is dispersed across the entire range of the angle $\theta1$. When the touch roll is in contact with the electrode plate 5 like the related art, an impact at the time of contact concentrates on one point (strictly speaking, one line extending in the width direction). Due to this, as shown in FIG. 5, lack of hiding 10 happens in a portion A on which the touch roll is in contact, within a coated region of the electrode plate 5. In the lack of hiding 10, the electrode mixture layer is missing. Bruise is likely to happen too. Further, as shown in FIG. 3, a generated peeled piece 11 of the electrode mixture layer is conveyed on the electrode plate 5 to a post-process and can cause bruise. By using the foregoing nipping bar 3 like this embodiment, such harmful effects do not happen.

In particular, because the foregoing relationships between the angle $\theta1$ and the angle $\theta2$ are satisfied, tear of the electrode plate 5 itself is prevented. When the size of the angle $\theta1$ is larger than 80% of the size of the angle $\theta2$, the electrode plate 5 can tear. This is because frictional force applied to the electrode plate 5 becomes excessive. When the region of the angle $\theta1$ goes beyond the region of the angle $\theta2$, the electrode plate 5 can also tear. However, when the foregoing relationships are satisfied like this embodiment, such problems do not happen. When the size of the angle $\theta1$ is less than 10% of the size of the angle $\theta2$, it is substantially not very different from the case of the touch roll. However, this does not happen in this embodiment.

Further, in the pressing device 1 according to this embodiment, it is preferred that moving speed of the nipping bar 3 during a pressing operation of the nipping bar 3 (an operation from the retracted state in FIG. 2 to the pressed state in FIG. 1) as the push-out member 4 is pushed out is within a range of 1.0~2.5 mm/second. When the pressing operation of the nipping bar 3 is done too fast, an impact at the time of contact becomes great as well. Meanwhile, when the pressing operation is done too slowly, the electrode plate 5 is pressed too late, and the electrode plate 5 can move in the width direction. It is favorable that pressing operation is done within the foregoing range. The structure of the push-out member 4 is arbitrary, and may be of any type such as hydraulic, pneumatic, electromagnetic, and elastic member type.

Table 1 shows examples and comparative examples. In the examples and comparative examples shown in Table 1, various conditions were changed and tests were conducted to observe presence of lack of hiding, bruise, and tear of the electrode plate 5. Lack of hiding and bruise were observed and inspected with a flaw inspection device. The terms in the columns of Table 1 are defined as follows: an angular ratio is an angular ratio between the foregoing angle $\theta1$ and angle $\theta2$, closing speed is speed of a pressing operation by the nipping bar 3, passing speed is conveying speed of the electrode plate 5, a foil thickness is a thickness of a current collector foil of the electrode plate 5, and a foil width is a size of the electrode plate 5 in the width direction.

TABLE 1

| | Angular ratio | Closing speed [mm/s] | Passing speed [m/min] | Foil Thickness [μm] | Foil width [mm] | Result |
|---|---|---|---|---|---|---|
| Comparative Example 1 | 1% | 2.5 | 20 | 10 | 300 | Bad (lack of hiding, bruise) |
| Comparative Example 2 | 5% | | | | | Bad (lack of hiding, bruise) |
| Example 1 | 10% | | | | | Very good |
| Example 2 | 30% | | | | | Very good |
| Example 3 | 50% | | | | | Very good |
| Example 4 | 80% | | | | | Very good |
| Comparative Example 3 | 100% | | | | | Bad (tear) |
| Example 5 | 50% | 1.0 | | | | Good |

TABLE 1-continued

| | Angular ratio | Closing speed [mm/s] | Passing speed [m/min] | Foil Thickness [µm] | Foil width [mm] | Result |
|---|---|---|---|---|---|---|
| Example 6 | | 2.0 | | | | Very good |
| Example 7 | | 2.5 | | | | Very good |
| Example 8 | | 3.5 | | | | Good |
| Example 9 | | 5.0 | | | | Good |
| Example 10 | | 2.5 | 50 | | | Very good |
| Example 11 | | | 100 | | | Very good |
| Example 12 | | | 20 | 15 | | Very good |
| Example 13 | | | | 20 | | Very good |
| Example 14 | | | | 10 | 200 | Very good |

In the examples and comparative examples in Table 1, standard conditions are an angular ratio of 50%, closing speed of 2.5 mm/second, passing speed of 20 mm/minute, a foil thickness of 10 µm, and a foil width of 300 mm. In any of the examples and comparative examples (except comparative example 3), the angle θ1 is completely included in the angle θ2. In the comparative example 3, the region occupied by the angle θ1 and the region occupied by the angle θ2 coincide with each other.

The angular ratio between 1% and 100% is assigned to examples 1~4 and comparative examples 1~3. The rest of the conditions follow the standard conditions. Among them, in comparative examples 1~3, the angular ratio departs from the foregoing range of 10~80%. Examples 1~4 all had good results with absolutely no lack of hiding, bruise, or tear. However, in comparative examples 1 and 2, lack of hiding and bruise happened. It is understood because the angular ratio was too small and caused a situation that is not substantially very different from line contact. Meanwhile, in comparative example 3, lack of hiding and bruise did not happen, but tear of the electrode plate 5 occurred. This is understood because the angular ratio was too large, and excessive frictional force was thus applied to the electrode plate 5.

In examples 5~9, closing speed between 1.0 mm/second and 5.0 mm/second is assigned. The rest of the conditions follow the foregoing standard conditions. Among them, examples 6 and 7 had good results without any lack of hiding, bruise, and tear whatsoever. In example 5, the closing speed was very close to the lower limit of the favorable range of 1.0~2.5 mm/second, and, although there was no lack of hiding, bruise, and tear, displacement of the electrode plate 5 happened in rare cases when tested many times. In examples 8 and 9, the closing speed is higher than the upper limit of the favorable range, and lack of hiding and bruise happened in rare cases when test was conducted many times. It was judged that results of examples 5, 8, and 9 did not deserve to be rated as "bad", and the results were rated as "good" in the result column of Table 1 (the rest of the examples were rated "very good").

In examples 10 and 11, passing speed is higher than that of the standard conditions. In examples 12 and 13, a foil thickness is larger than that of the standard conditions. In example 14, a foil width is different from that of the standard conditions. In any of these examples, the rest of the conditions follow the foregoing standard conditions. All of the examples 10~14 had good results without any lack of hiding, bruise, and tear at all.

Figure 6:
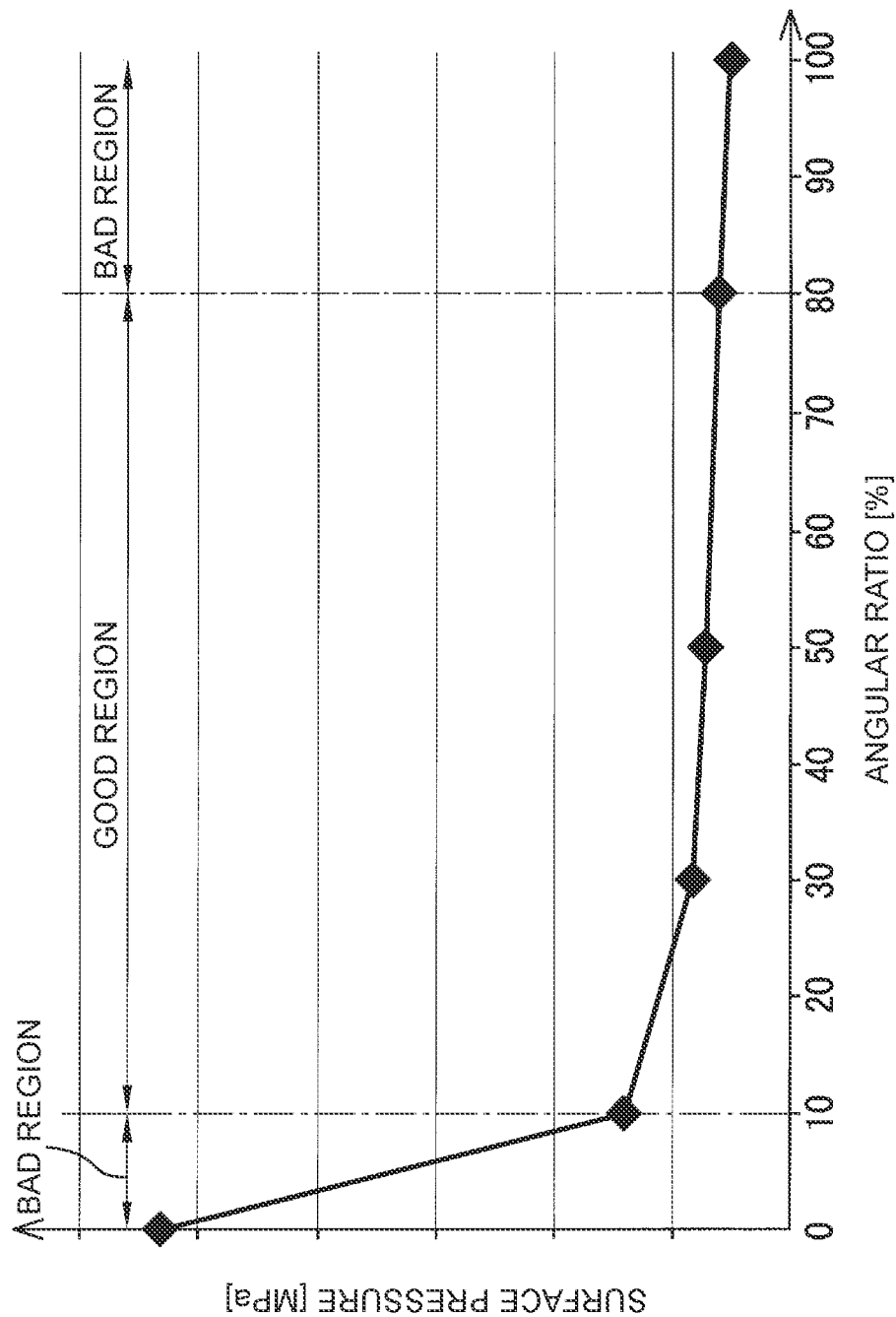
FIG. 6 is a graph showing a relationship between an angular ratio and a surface pressure.

FIG. 6 is a graph showing a relationship between an angular ratio and surface pressure. The surface pressure herein means pressure applied to the electrode plate 5 in a section nipped between the free roll 2 and the nipping bar 3 in the pressed state shown in FIG. 1. According to FIG. 6, in a region with an angular ratio of less than 10%, the surface pressure rises rapidly. Therefore, in a region with an angular ratio of less than 10%, it is likely that lack of hiding and bruise happen. Meanwhile, in a region with an angular ratio over 80%, a value of surface pressure is not very much different from that of a region with an angular ratio of 10~80%. However, in a region with a large angular ratio like this, there is also a possibility that frictional force applied to the electrode plate 5 becomes excessive. Therefore, in such a region, tear of the electrode plate 5 tends to happen.

Figure 7:
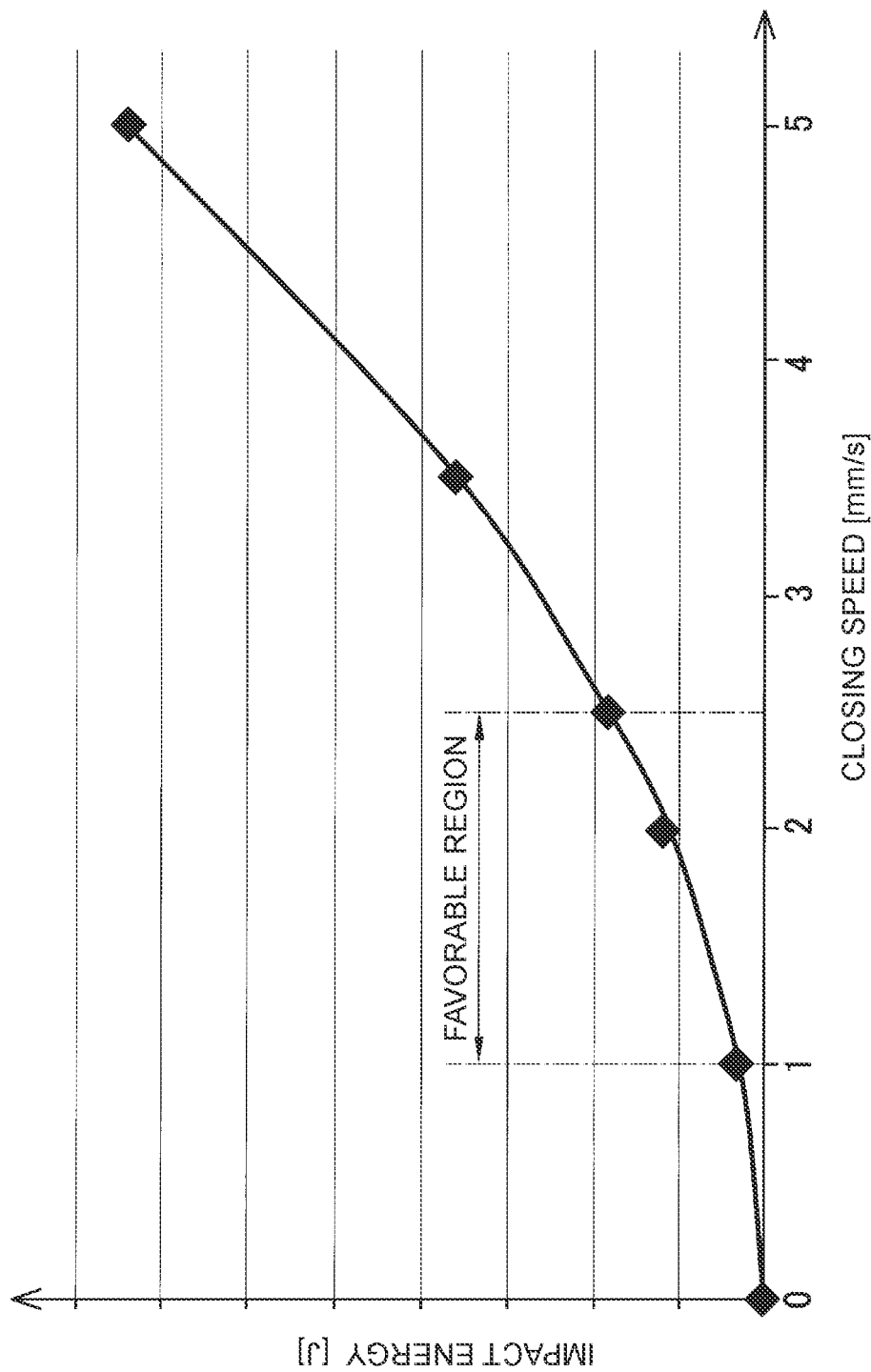
FIG. 7 is a graph showing a relationship between closing speed and impact energy.

FIG. 7 is a graph showing a relationship between closing speed and impact energy when the nipping bar 3 comes into contact with the electrode plate 5. As a matter of course, the higher the closing speed is, the larger the impact energy becomes. When the impact energy is large, it is undeniable that lack of hiding and bruise are more likely to happen. Therefore, as stated above, there is an upper limit value for favorable closing speed. On the contrary, when the impact energy is small, closing speed becomes low, and the electrode plate 5 can be pressed too late. Therefore, as stated above, there is a lower limit value for the favorable closing speed.

As explained so far in detail, according to this embodiment, the nipping bar 3 having the concave surface 7 as a pressing surface is used as one that presses the electrode plate 5 against the free roll 2 when conveyance of the electrode plate 5 is stopped. Then, a range occupied by the concave surface 7 satisfies given relationships with regard to a contact region between the electrode plate 5 and the free roll 2. Thus, the pressing device 1 for the electrode plate 5 is realized, in which local peeling of the electrode mixture layer seldom happens when pressing the electrode plate 5 while conveyance is stopped. Also, a method for manufacturing the electrode plate 5 is realized, in which the pressing device 1 is used so that the free roll 2 is brought into contact with one surface of the electrode plate 5 in the conveyance process, and, when the conveyance is stopped, the nipping bar 3 is brought into contact with the surface of the electrode plate 5 on the opposite side, and the electrode plate 5 is pressed against the free roll 2 so as to prevent displacement of the electrode plate 5. Further, by containing the closing speed of the nipping bar 3 within a favorable range, it is possible to further ensure that peeling of the electrode mixture layer and displacement of the electrode plate 5 are prevented.

This embodiment is described as an example only, and does not limit the disclosure in any way. Therefore, it is of course possible to make various improvements and modifications of the disclosure without departing from the gist of the disclosure. For example, a process that comes to the position of the post-process in FIG. 1 can be a press slitting process, in addition to the foregoing pressing process.

Figure 8:
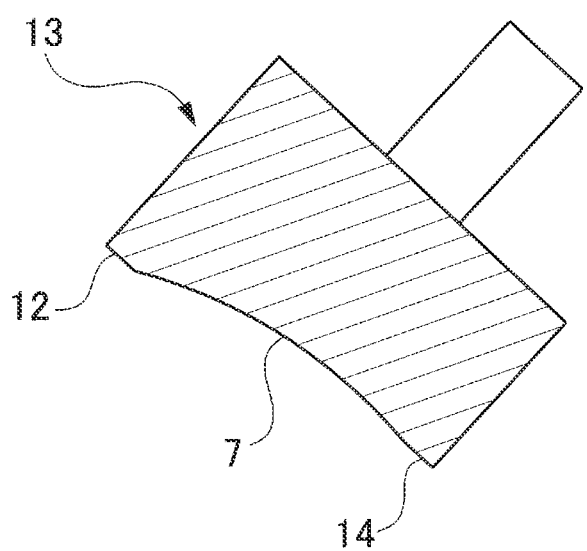
FIG. 8 is a sectional view of a modification of the nipping bar.

Further, instead of the nipping bar 3, a nipping bar 13 shown in FIG. 8 may be used. In the nipping bar 13, a receiving surface 12 on an upstream side of a concave surface 7 and a sending surface 14 on a downstream side are added. Neither the receiving surface 12 nor the sending surface 14 is in contact with the electrode plate 5 in the pressed state shown in FIG. 1. This is because, these surfaces are recessed more than a virtual cylindrical surface extending from the concave surface 7 in a view from the electrode plate 5 side. In short, only a part of a surface of the nipping bar on the electrode plate 5 side may become the concave surface 7. As a matter of course, in the case of this nipping bar 13, the angle θ1 shown in FIG. 1 is defined only by the part that serves as the concave surface 7. The nipping bar 13 may only have either the receiving surface 12 or the sending surface 14.

What is claimed is:

1. A pressing device for an electrode plate, in which the electrode plate has an electrode mixture layer at least on a first surface of the electrode plate, the pressing device comprising:
   a roll member that is in contact with a second surface of the electrode plate being conveyed; and
   a pressing member that comes into contact with the first surface of the electrode plate and presses the electrode plate against the roll member when conveyance of the electrode plate is stopped, wherein
   a concave surface section is formed on a surface of the pressing member that comes into contact with the electrode plate, the concave surface section being a concave surface with a curvature that matches a curvature of a curve of the first surface of the electrode plate on the roll member,
   a first angle region is included in a second angle region, the first angle region being an angle region of the concave surface section seen from a central axis of the roll member in a state where the electrode plate is pressed against the roll member by the pressing member, and the second angle region being an angle region of a contact region between the second surface of the electrode plate and the roll member, which is seen from the central axis of the roll member, and
   a size of the first angle region is within a range of 10~80% of a size of the second angle region.

2. The pressing device for the electrode plate according to claim 1, further comprising
   a push-out member that moves the pressing member at speed within a range of 1.0~2.5 mm/second from a separated position where the pressing member does not press the electrode plate to a pressing position where the pressing member presses the electrode plate.

3. The pressing device for the electrode plate according to claim 1, wherein
   the pressing member is a stationary pressing member that presses the electrode plate against the roll member in a stationary state.

4. The pressing device for the electrode plate according to claim 1, wherein
   the first angle region is in a range from a start-of-contact position to an end-of-contact position between the electrode plate and the concave surface of the pressing member when the electrode plate is conveyed, and
   the second angle region is in a range from a start-of-contact position to an end-of-contact position between the electrode plate and the roll member when the electrode plate is conveyed.

5. The pressing device for the electrode plate according to claim 1, wherein
   the surface of the pressing member that comes into contact with the electrode plate includes a surface that is depressed more than a virtual cylindrical surface extended from the concave surface in a view from an electrode plate side.

\* \* \* \* \*